US009095972B2

(12) United States Patent
Meacham et al.

(10) Patent No.: US 9,095,972 B2

(45) Date of Patent: Aug. 4, 2015

(54) RAILCAR MAINTENANCE CREEPER

(75) Inventors: William Shane Meacham, Myrtle Beach, SC (US); William W. Just, Florence, SC (US)

(73) Assignee: Sam Carbis Asset Management, LLC, Florence, SC (US)

( * ) Notice: Subject to any disclaimer, the term of this patent is extended or adjusted under 35 U.S.C. 154(b) by 423 days.

(21) Appl. No.: 13/325,888

(22) Filed: Dec. 14, 2011

(65) Prior Publication Data

US 2012/0091673 A1 Apr. 19, 2012

Related U.S. Application Data

(63) Continuation-in-part of application No. 12/868,098, filed on Aug. 25, 2010, now Pat. No. 8,573,607.

(51) Int. Cl.
*B62B 11/00* (2006.01)
*B25H 5/00* (2006.01)

(52) U.S. Cl.
CPC .................................... *B25H 5/00* (2013.01)

(58) Field of Classification Search
USPC ............................................ 280/32.5, 32.6
See application file for complete search history.

(56) References Cited

U.S. PATENT DOCUMENTS

| | | | | |
|---|---|---|---|---|
| 3,976,155 | A * | 8/1976 | Esch | 280/32.5 |
| 4,185,846 | A * | 1/1980 | Black | 280/32.6 |
| 5,330,211 | A * | 7/1994 | Nicholson | 280/32.6 |
| 5,503,415 | A * | 4/1996 | Powell | 280/32.6 |
| RE35,732 | E * | 2/1998 | Shockley | 296/136.07 |
| 5,897,122 | A * | 4/1999 | Borner | 280/32.6 |
| 6,302,413 | B1 * | 10/2001 | Comeaux | 280/32.5 |
| 6,361,111 | B1 * | 3/2002 | Bowers et al. | 297/344.22 |
| 6,398,234 | B1 * | 6/2002 | Brown | 280/32.6 |
| 6,425,590 | B1 * | 7/2002 | Whiteside et al. | 280/32.6 |
| 6,578,857 | B1 * | 6/2003 | Whiteside et al. | 280/32.6 |
| 6,578,859 | B2 * | 6/2003 | Chen | 280/87.01 |
| 6,733,073 | B2 * | 5/2004 | Whiteside et al. | 297/188.08 |
| 6,857,644 | B2 * | 2/2005 | Hsiao | 280/79.2 |
| 6,969,077 | B2 * | 11/2005 | Liu | 280/30 |
| 7,070,241 | B2 * | 7/2006 | Saulnier et al. | 297/423.12 |
| 7,237,781 | B2 * | 7/2007 | Canova | 280/32.6 |
| 7,363,864 | B2 * | 4/2008 | Broek | 104/106 |
| 7,694,630 | B2 * | 4/2010 | Straub et al. | 104/5 |
| 7,743,710 | B2 * | 6/2010 | Gordon | 104/53 |
| 8,573,607 | B2 * | 11/2013 | Meacham et al. | 280/32.6 |
| 8,590,907 | B2 * | 11/2013 | Hurt et al. | 280/87.021 |
| 8,596,651 | B2 * | 12/2013 | Canova | 280/32.5 |
| 2001/0025740 | A1 * | 10/2001 | Ehnes | 182/12 |
| 2005/0098966 | A1 * | 5/2005 | Canova | 280/32.6 |
| 2012/0038122 | A1 * | 2/2012 | Canova | 280/32.6 |
| 2012/0049471 | A1 * | 3/2012 | Meacham et al. | 280/32.6 |
| 2012/0091673 | A1 * | 4/2012 | Meacham et al. | 280/32.6 |
| 2012/0235371 | A1 * | 9/2012 | Smith | 280/32.6 |

* cited by examiner

*Primary Examiner* — Jeffrey J Restifo
(74) *Attorney, Agent, or Firm* — Amy Allen Hinson; Nexsen Pruet, LLC

(57) ABSTRACT

A creeper is provided wherein the creeper has a main frame having a front, a rear, a first side, and an opposing second side. The main frame also includes wheels attached at the front and rear of the main frame, a handle attached at the rear of the main frame, and a rotatable platform. Pressure is applied to the handle thereby lifting the main frame onto railway tracks positioned under a railcar so that personnel can obtain access under the railcar and perform maintenance and work to the underside of the railcar.

15 Claims, 10 Drawing Sheets

RAILCAR MAINTENANCE CREEPER

CROSS REFERENCE TO RELATED APPLICATIONS

This application is a continuation-in-part application of pending U.S. patent application Ser. No. 12/868,098 filed Aug. 25, 2010 now U.S. Pat No. 8,573,607 which is incorporated herein by reference.

BACKGROUND

The present invention is related to an improved creeper for use in the repair and maintenance of railcars. More specifically, the present invention is related to an improved creeper which allows easy, and safe, transit under a railcar.

Railcar maintenance is an ongoing activity. In general, a railcar comprises a frame on an undercarriage with some type of cargo holding element, such as a flat bed or a superstructure, on the frame. Superstructures extend above the frame and are configured to carry some form of cargo. Superstructures include various carrier devices such as container boxes, car carriers, chemical containers, grain containers, livestock containers and the like without limit thereto.

The undercarriage includes the wheel assembly and operational systems such as braking, which may be considered part of the wheel assembly, hydraulics, communication links, etc. Due to the large number of components associated with the undercarriage, or below the frame, there is a constant need for maintenance personnel to work under the railcar. There are inherent dangers associated with personnel working under a railcar. Due to the overhead height the personnel must crawl, bend over, or walk in a squatted fashion to reach access to the underside of the railcar. This is obviously in conflict with good ergonomic practice and uncomfortable to the personnel. It is not uncommon for the personnel to stand up, either accidentally or in response to discomfort, which may cause contact between the personnel and the railcar.

There has been an ongoing need for a creeper which is specifically suited for use under a railcar.

SUMMARY

It is an object of the invention to provide a creeper specifically designed for use under a rail car.

It is another object of the invention to provide a work platform for use under a rail car which allows the maintenance personnel freedom to move without the encumbrances associated with a confined overhead space.

A particular feature of the invention is the versatility associated with a rotational and translatable seat.

These and other advantages, as will be realized, are provided in a creeper particularly adapted for operation under a railcar. In one embodiment, the creeper has a main frame including a front and a rear. Wheels and a handle are attached to the main frame. The handle is attached to the mainframe rearward of the wheels. A platform is slidably attached to the main frame. Rail engagement brackets are attached to the mainframe forward of the wheels.

In another embodiment of the creeper of the present invention, the creeper has a main frame including a front, a rear, a first side, and an opposing second side. First wheels are attached at the front of the main frame and second wheels are attached at the rear of the main frame. A handle is attached to the main frame at the rear of the main frame and a rotatable platform is also attached to the main frame.

In yet another embodiment of the creeper of the present invention, the creeper has a main frame including a front, a rear, a first side, an opposing second side, and a track. The track is positioned between the front and the rear of the main frame and has a first end attached to the first side of the main frame and a second end attached to the opposing second side of the main frame. First wheels are attached at the front of the main frame and second wheels are attached at the rear of the main frame. A handle is attached to the main frame at the rear of the main frame and a rotatable platform is attached to the main frame. The rotatable platform slides between the first side and the opposing second side of the main frame along the track of the main frame. A seat is affixed to the platform and includes a seat bottom and a seat back.

Yet another embodiment is provided in a method for accessing an undercarriage on a railcar. A creeper is provided wherein the creeper has a main frame including a front and a rear; wheels attached to the main frame; a handle attached to the mainframe rearward of said wheels; a platform slidably attached to the main frame and rail engagement brackets attached to the mainframe forward of the wheels. Pressure is applied to the handle thereby lifting the front of the main frame thereby supporting the creeper on the wheels. The creeper is moved to a position under the railcar. Pressure is removed from the handle thereby allowing the front of the creeper to lower wherein the rail engagement brackets engage with rails of a track. A worker lies on the platform and slides the platform under the railcar.

Another embodiment is provided in a method for accessing an undercarriage on a railcar. A creeper is provided wherein the creeper includes a main frame having a front, a rear, a first side, and an opposing second side; first wheels attached at the front of the main frame; second wheels attached at the rear of the main frame; a handle attached to the main frame at the rear of the main frame; and a rotatable platform attached to the main frame. Downward pressure is applied to the handle thereby lifting the front of the main frame thereby supporting the creeper on the first wheels. The creeper is moved to a position under the railcar and pressure is removed from the handle thereby allowing the front of the creeper to lower onto rails of a track. A worker lies on the platform and positions the platform under the railcar.

DESCRIPTION OF REPRESENTATIVE EMBODIMENTS

The present invention is directed to a railcar maintenance creeper which is particularly suited for use under the undercarriage of a railcar. More specifically, the creeper engages with the track to secure the position thereof.

Embodiments of the invention will be described with reference to the figures which form an integral, non-limiting, part of the application. Throughout the various figures similar elements will be numbered accordingly.

Figure 1:
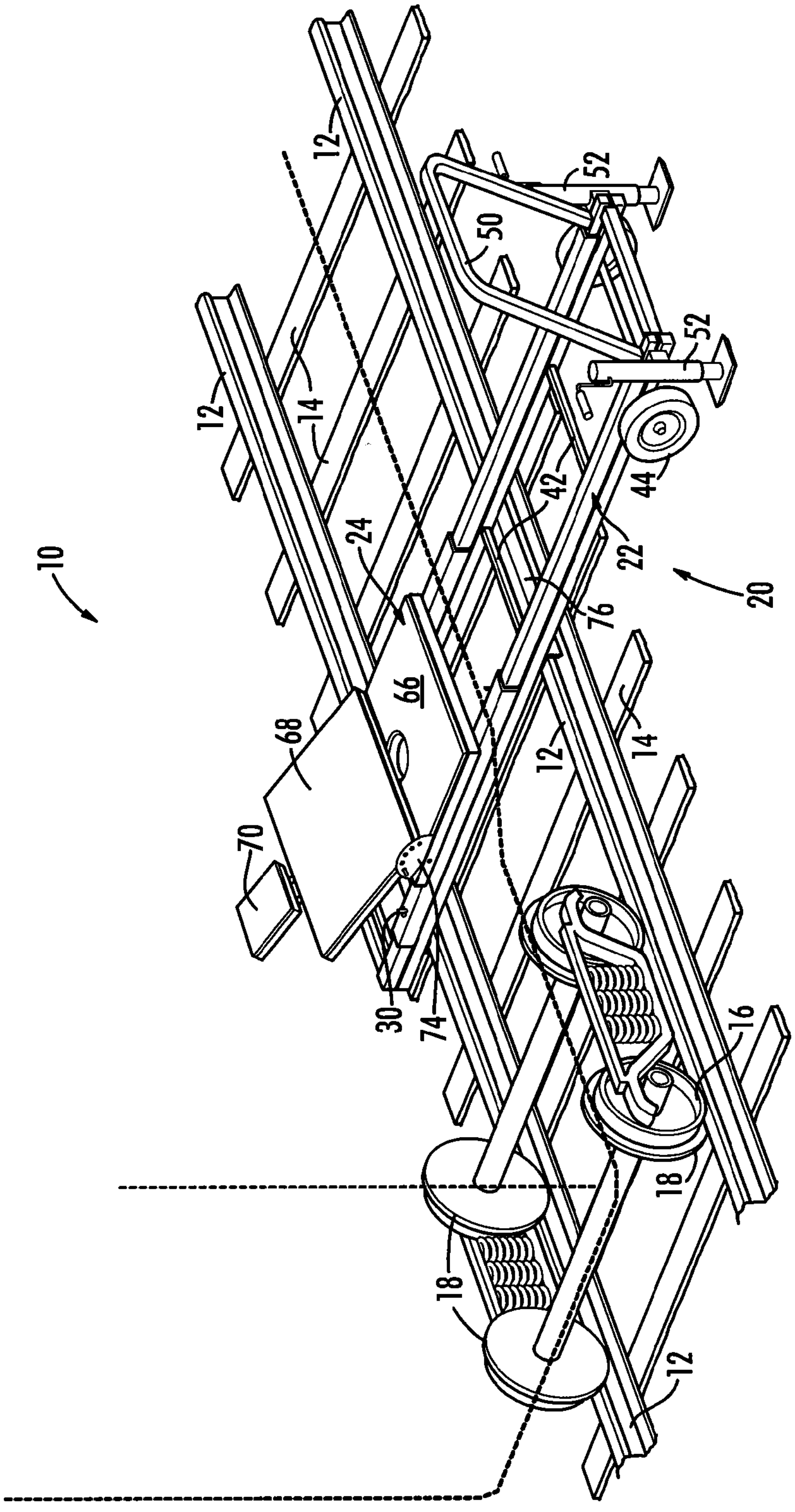
FIG. 1 is a schematic view of an embodiment of the invention.

An embodiment of the invention is illustrated schematically in FIG. 1. In FIG. 1, a railcar, 10, generally illustrated in partial phantom view as a box car but not limited thereto, is on a railway track having a pair of parallel rails, 12, with crossties, 14, spanning there between as is standard with a rail system. The railcar, 10, comprises wheels, 16, which ride on the top of the rails. As is well known, the wheels comprise flanges, 18, preferably on the interior, which engage with the side of the track to insure that the wheels roll along the top of the rails. The rails are typically about 56.5" wide but this is based on historical convention. As well known to those of even passing knowledge of train tracks, the combination of a bed of rocks, cross ties which are substantially on top of the bed of rocks and the tracks on top of the cross ties, makes walking and working on a train track a strenuous and dangerous activity. A creeper, such as creeper 20 shown in FIG. 1, extends across the tracks in substantially perpendicular relationship to the rails.

Figure 2:
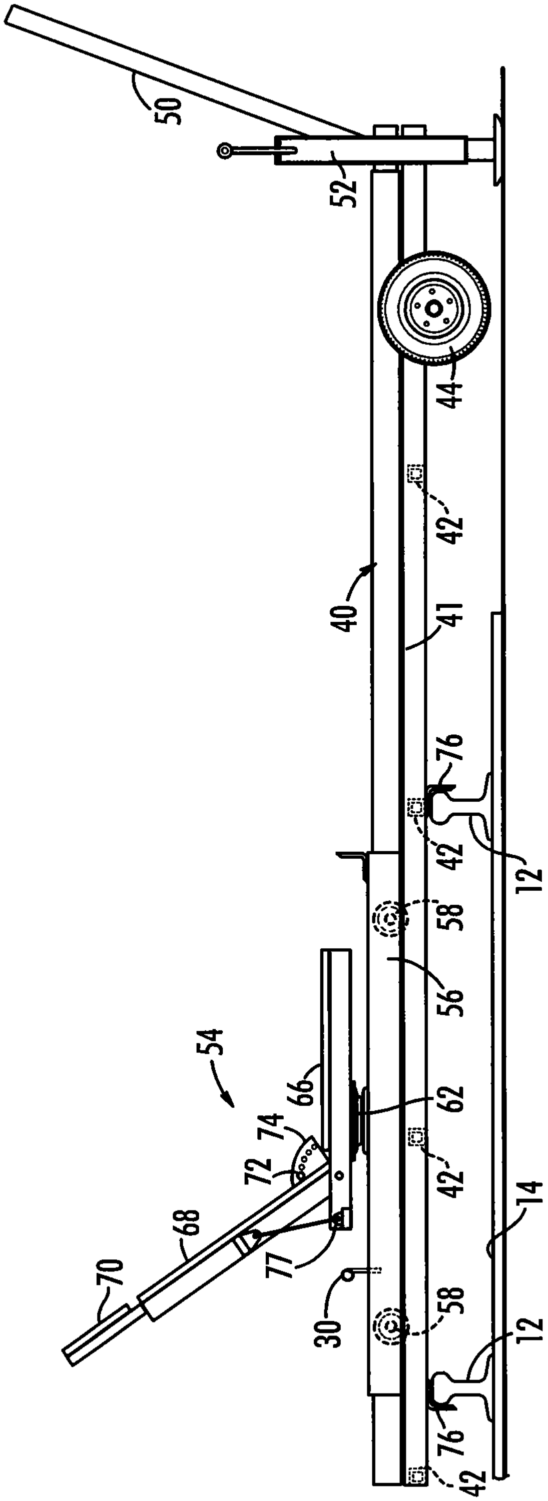
FIG. 2 is a schematic, partial cut-away, side view of an embodiment of the invention.
Figure 3:
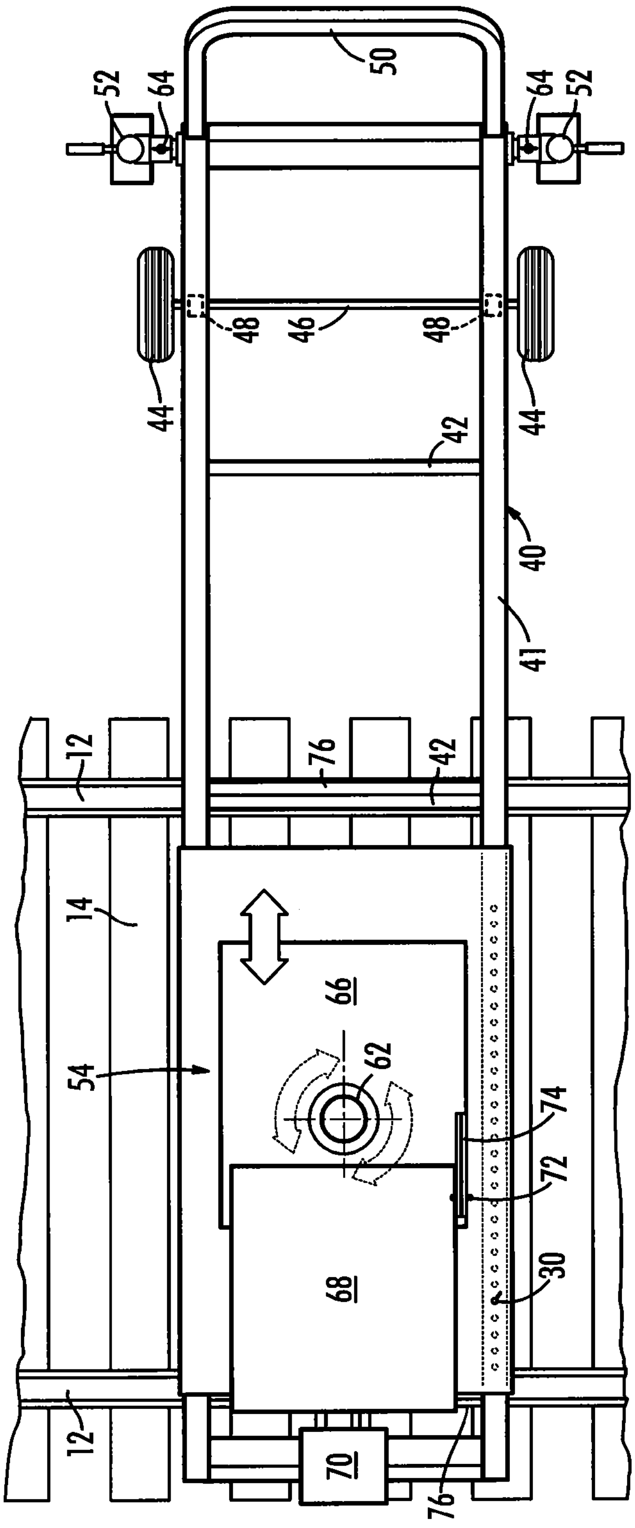
FIG. 3 is a schematic top view of an embodiment of the invention.
Figure 4:
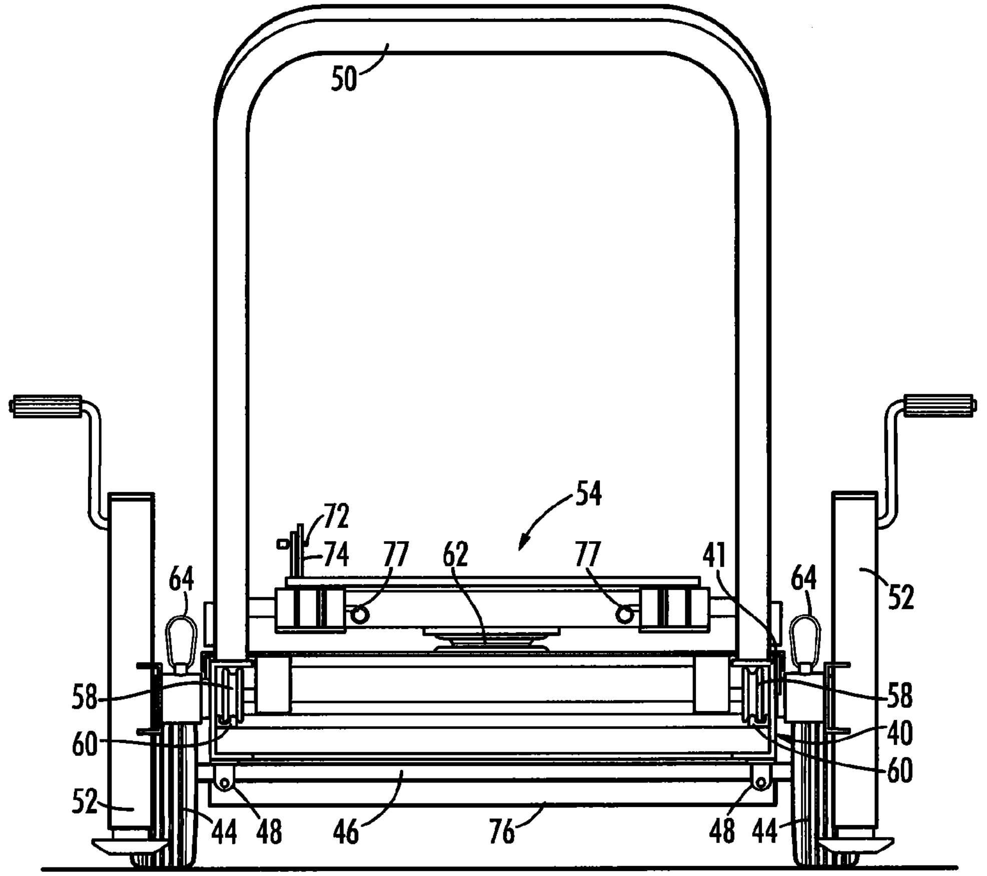
FIG. 4 is a schematic rear view of an embodiment of the invention.

An embodiment of the creeper is illustrated and will be described with reference to FIGS. 2-4. The creeper is illustrated schematically in side view in FIG. 2, in top view in FIG. 3 and in rear view in FIG. 4.

The creeper, 20, comprises a frame, 22, with a platform, 24, slidably attached to the platform. A pin, 30, reversibly engages with a component of the frame to temporarily prohibit the platform from sliding once it is in a preferred location. A handle, 50, preferably rearward of a set of wheels, 44, allows the front of the creeper to be elevated and rolled on the wheels. A bracket, 76, engages with the track to prohibit the creeper from moving once placed in operative position.

An embodiment of the creeper further comprises a rectangular main frame, 40, with side rails, 41, and cross-braces, 42, spanning between the side rails. The side rails and cross-braces are preferably aluminum yet other materials such as steel or composite materials, particularly fiber reinforced composites, may be employed for the side rails and cross-braces. The main frame may be manufactured by welding the components, by threaded members and appropriate brackets or by adhesives, and appropriate brackets, without limit thereto. It is particularly preferred that the side rails and cross-braces are aluminum and they are attached by welding due to the ease of manufacturing and weight considerations.

A pair of wheels, 44, preferably on a common axle, 46, are attached to the main frame to provide mobility. The wheels are preferably attached to the side rails by brackets, 48. Other assemblies such as a wheel and hub assembly can be used in lieu of an axle but these are less preferred due to cost considerations. While not limited thereto, it is preferred to use lock collars on the inside of the wheels to secure the wheels to the axle. The wheels are preferably attached towards the rear of the frame.

A handle, 50, is attached to the main frame, preferably at the side rails, and extends upward there from. It is most preferred that the handle be attached to the main frame at a point which is separated from, and rearward of, the axle thereby allowing the wheels to act as a pivot point as will be more easily understood from further discussion herein.

At least one jack, 52, is attached to the main frame, preferably rearward of the axle. The jack provides stability in use as will be realized from further discussion. The jack, or multiple jacks, is preferably rotatably mounted to the frame such that they can be rotated to a position which is essentially parallel to the frame for transport and substantially perpendicular to the frame when used as a stabilizer. A pin, 64, which is preferably spring loaded, locks the jack into at least one of a substantially perpendicular orientation or a substantially vertical orientation. Substantially perpendicular refers to a position wherein the jack can extend to engage the ground thereby stabilizing the creeper against movement whereas substantially parallel refers to a position wherein the jack is disengaged with the ground thereby allowing the creeper to be moved between locations by rolling on the wheels. The pin is withdrawn to rotate the jack and released to lock the jack in a preferred orientation. Jacks with spring loaded pins are commercially available through a variety of sources.

A platform, 54, is slidably mounted to the main frame. In one embodiment the platform is attached to a roller platform, 56. The roller platform, 56, moves parallel to the frame. In one embodiment the roller platform has rollers, 58, which roll on a track, 60, preferably attached to the main frame and preferably at the side rails.

The platform, 54, is preferably rotatably attached to the roller platform, 56, by a turntable, 62. The turntable allows the platform to rotate relative to the frame thereby increasing the range of reach available to the personnel using the creeper. The platform preferably comprises a seat, 66, and a back, 68, wherein the back is pivotally mounted, preferably, to the seat. An optional but preferred head rest, 70, is provided for comfort. A pin, 72, which is preferably spring loaded and biased for engaging with a protractor bracket, 74, is preferred for securing the back at a predetermined angle. A gas strut, 77, is mounted between the back and seat and biased toward extension. In use, the personnel can sit on the seat, pull the pin, 72, against the bias of the spring if necessary and allow the gas strut to persuade the back into a decreasing angle relative to the seat. When the proper angle is reached the spring loaded pin is released thereby reversibly securing the back at the desired angle relative to the seat. A removable pin, which is preferably tethered can be used. To lower the seat the personnel pulls the pin while allowing their weight to persuade the back towards a parallel arrangement with the seat against the persuasion of the gas strut. A pin, 30, engages temporarily locks the platform in a location along the frame. The pin, 30, may be spring loaded.

Rail brackets, 76, are preferably attached to the bottom of the frame and separated approximately the width of the outside of standard rails.

In use, the jacks are secured in a position which is parallel to the frame or at least to a position which will allow the creeper to be moved by rolling the creeper on the wheels. The platform back is positioned to be approximately parallel to the seat. The creeper is driven by engaging the handle. Downward pressure is applied to the handle thereby lifting the front of the creeper off of the ground such that the weight of the creeper is supported by the wheels. The creeper is then rolled under a rail car to a position where the rail brackets are engaged with the rail thereby prohibiting rolling in a direction which is perpendicular to the rails. The pressure is removed from the handle thereby allowing the front of the creeper to drop onto the rails. The jacks are then rotated to a position for engagement with the ground, which is preferably about perpendicular with the frame, and extended to place the creeper in an engaging relationship with the rails wherein the rail brackets are either both inside the rails or both outside the rails. The creeper is therefore engaged with the rails on the front and the ground, via the jacks, in the back thereby prohibiting motion. The personnel than lays on the platform and rolls the platform under the rail car to a suitable position to perform the desired function. If necessary the platform can be rotated on the turntable or the back can be raise thereby allowing the personnel to work in a sitting position instead of laying down. Once the operation is complete the process is reversed thereby removing the creeper from under the rail car.

Figure 5:
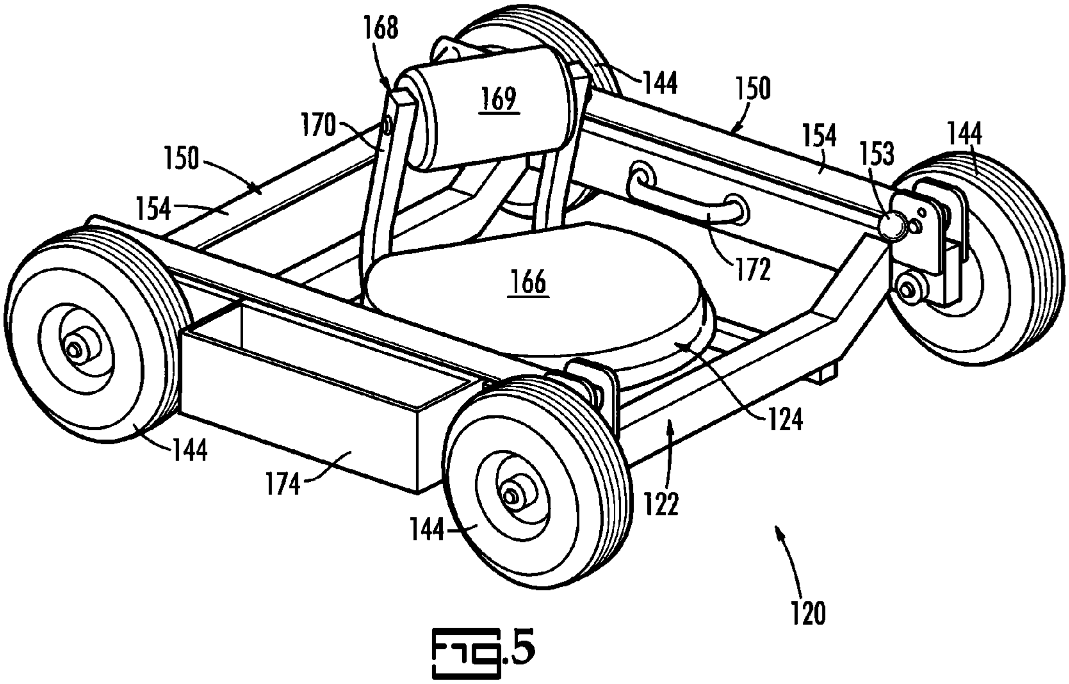
FIG. 5 is a schematic perspective view of an embodiment of the invention.
Figure 6:
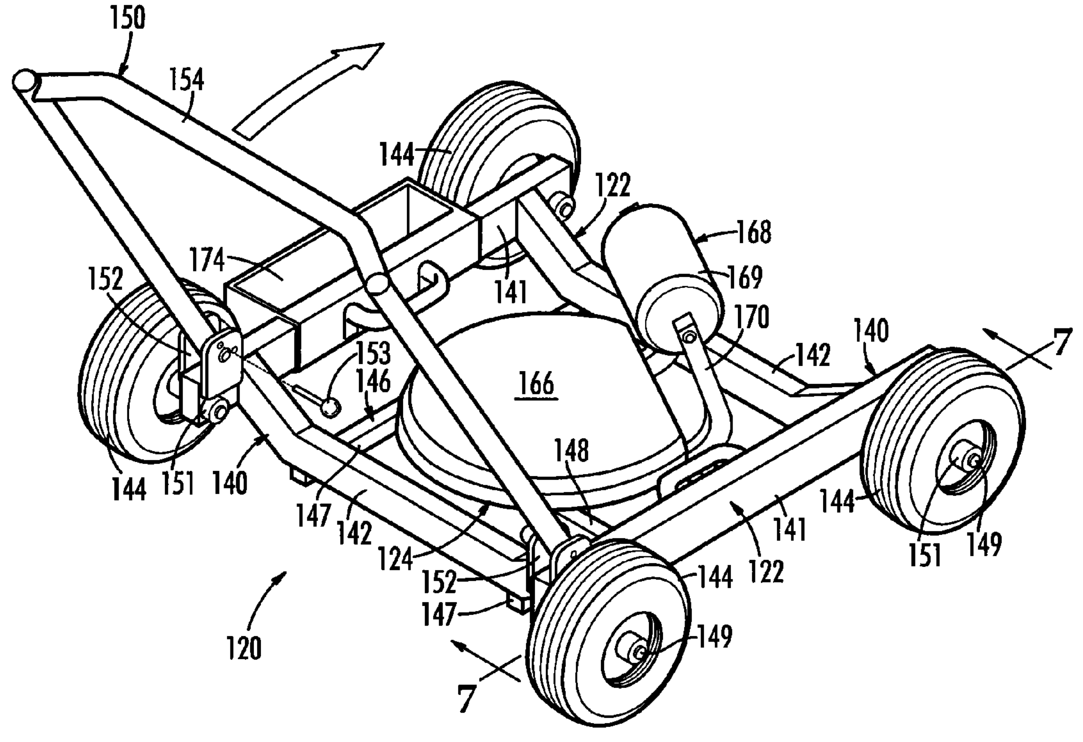
FIG. 6 is a schematic perspective view of an embodiment of the invention.

Another embodiment of the creeper is illustrated and will be described with reference to FIGS. 5-7. Like creeper, 20, creeper, 120, comprises a frame, 122, with a platform, 124, attached to the frame, 122. A handle, 150, preferably adjacent to a set of wheels, 144, allows the front of the creeper to be rolled on the wheels, 144.

The creeper, 120, may further comprise a rectangular main frame, 140, with a pair of side rails, 141, and a pair of front and rear cross-braces, 142, spanning between the side rails. The creeper, 120, may also comprise a secondary frame, 146, for supporting the platform, 124. As shown in the embodiment of FIGS. 5-7, the secondary frame, 146, includes a pair of side rails, 147, and a pair of cross-braces, 148. Platform, 146, is preferably positioned on a rotatable turntable device, 162, secured to side rails, 147, and/or cross-braces, 148, so that platform, 124, may rotate relative to main and secondary frames, 140 and 146. A more detailed example of a rotatable turntable device is shown in the embodiment of FIGS. 2 through 4.

The side rails and cross-braces of creeper, 120, are preferably aluminum yet other materials such as steel or composite materials, particularly fiber reinforced composites, may be employed for the side rails and cross-braces. The main frame and/or secondary frame may be manufactured by techniques such as welding the components, by threaded members and appropriate brackets or by adhesives, and appropriate brackets, without limit thereto.

A set of wheels, 144, may be attached to the main frame, 140, to provide mobility. In the embodiment shown in FIGS. 5-7, the wheels are positioned at the outer four corners of main frame, 140, and are attached to the outer edges of side rails, 141, by axles, 149, extending through openings in each wheel, 144, and respective side rail, 141. The axles, 149, are secured in place using various techniques, such as attaching lock collars, 151, to the outer ends of the axles, 149.

Figure 7:
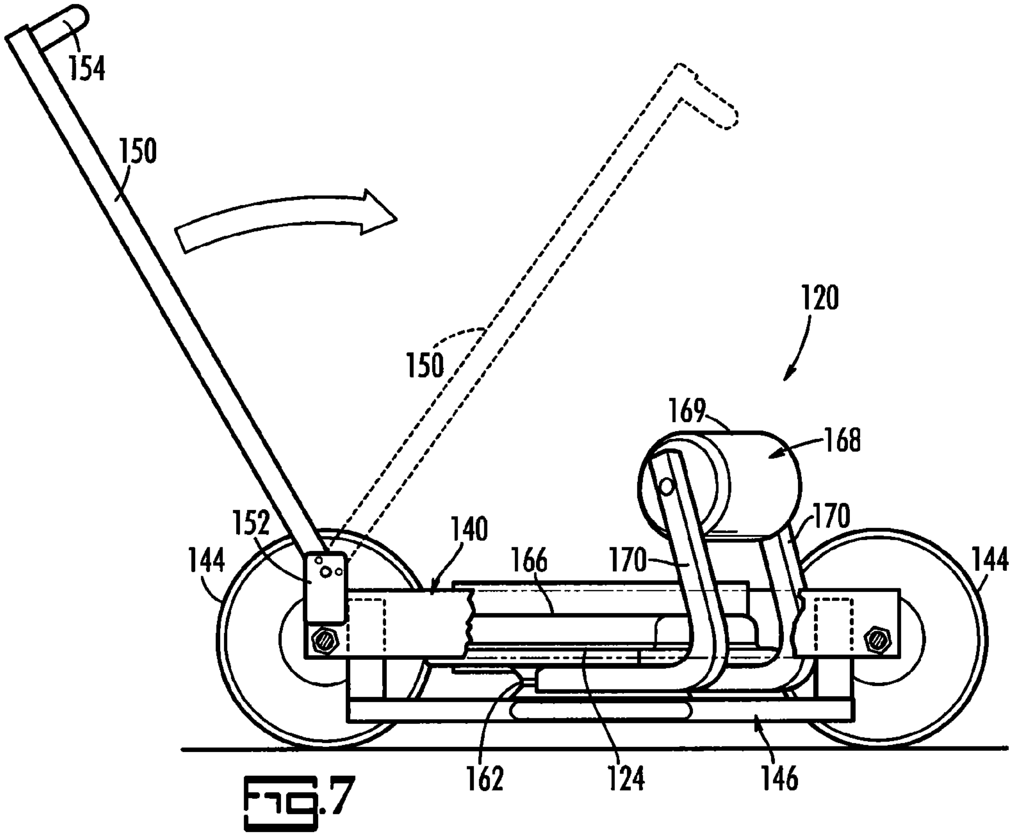
FIG. 7 is a schematic side view of an embodiment of the invention.

As shown in FIG. 7, a handle, 150, is pivotably attached to the main frame, 140, by brackets, 152, affixed to side rails, 141. Handle, 150, is preferably pivotable between an upright position shown in FIG. 6 and a stored position shown in FIG. 5. A pin, 153, located on one or both sides of handle, 150, may be used to secure handle, 150, in either the upright or stored position. Handle, 150, may include a handrail, 154, for pushing creeper, 120. Handrail, 154, may conform to the shape of cross-brace, 142, to create a more compact shape with the creeper, 120, in the stored position shown in FIG. 5.

Platform, 124, may be slidably mounted to the main or secondary frame of the creeper, such as by a roller platform that moves parallel to the side rails, 147, and/or cross-braces, 148. As discuss above, platform, 124, is preferably rotatably secured to the main frame, 140, and/or the secondary frame, 146, such as by a turntable device, 162. The turntable device, 162, allows the platform, 124, to rotate relative to the main and/or secondary frame thereby increasing the range of reach available to the personnel using the creeper.

The platform, 124, preferably comprises a seat, 166, and a back, 168, wherein the back, 168, is preferably mounted to the seat. A head rest may also be provided for comfort. In the embodiment shown in FIGS. 5 through 7, the back, 168, includes a roll bar, 169, with mounting brackets, 170, for mounting the roll bar, 169, to the seat, 166. Roll bar, 169, may be adjustable between a raised working position and a lowered storing position. In the embodiment shown, mounting brackets, 170, are L brackets, which attach to the outer ends of roll bar, 169, and secure beneath seat, 166, such as by screws inserted through brackets, 170, and into seat, 166. A roll bar, 169, may be used instead of a flat back for comfortable adjustment between horizontal and vertical working positions based on pressure applied to the roll bar, 169.

Handles, 172, may be positioned adjacent to seat, 166, to assist a worker in balancing and changing positions. Moreover, a compartment, 174, may be affixed to frame, 122, such as at side rails, 141, for storage and collection of miscellaneous items such as tools, while work is being performed.

When the creeper, 120, is used in connection with a railcar on a railway track, the creeper is preferably positioned perpendicular to the rails of the railway track. The creeper, 120, may be driven by engaging the handle, 150, towards the rails, and once the front wheels, 144, of the creeper, 120, reach the near rail of the railway track, downward pressure may be applied to the handle, 150. The front of the creeper, 120, including the front wheels, 144, lifts off of the ground and the weight of the creeper, 120, is supported by the rear wheels, 144. The creeper, 120, may then be rolled under a rail car and the front wheels, 144, are then rolled over the near rail of the railway track. Once the rear wheels, 144, of the creeper approach the near rail, the weight of the creeper may then be distributed to the front wheels, 144, such as by pushing up on the handle, 150. The rear wheels, 144, may then be rolled over the near rail of the railway track. Once the rear wheels, 144, are over the near rail, pressure may be released from the handle, 150, allowing all wheels, 144, of the creeper to drop onto the rails. Both the rear and front wheels, 144, of the creeper, 120, are now positioned between the near and far rails of the railway track.

The worker then may sit on the platform, 124, and roll the creeper, 120, to a desired location under the railcar to perform a desired function. If necessary, the platform can be rotated on a turntable, 162, or slid to a desired position on a roller platform if included in the particular embodiment. The handle, 150, can remain in the upright position, which may abut the railcar surface and stop the creeper from going all the way to the far rail of the railway track. Alternatively, the pin, 153, may be removed from the handle, 150, allowing the handle, 150, to either collapse over the creeper, 120, or collapse away from the creeper, 120. Once the operation is complete the process is reversed thereby removing the creeper, 120, from under the rail car.

Yet another embodiment of the creeper is illustrated and will be described with reference to FIGS. 8-10. Like creepers, 20 and 120, creeper, 220, comprises a frame, 222, with a platform, 224, attached to the frame, 222. A handle, 250, preferably adjacent to a set of wheels, 244, such as pneumatic casters, allows the front of the creeper, 220, to be rolled on the wheels, 244. Creeper, 220, may be multi-directional and allow for side to side, front to back, and rotational movement.

The frame, 222, of creeper, 120, may include a pair of side rails, 241, and a pair of front and rear cross-braces, 242, spanning between the side rails, 241. The frame, 222, of creeper, 220, may also comprise a support member, 246, for supporting the platform, 224.

The side rails and cross-braces of creeper, 220, are preferably lightweight aluminum yet other materials such as steel or composite materials, particularly fiber reinforced composites, may be employed for the side rails and cross-braces. Moreover, side rails and/or cross-braces of creeper, 220, may be formed as hollow tubes wherein tube caps are frequently used to cover the openings at the ends of the tubes to eliminate debris from entering the tubes and to increase tube strength. The creeper, 220, may be manufactured by techniques such as welding the components, by threaded members and appropriate brackets or by adhesives, and appropriate brackets, without limit thereto. To accommodate most railway tracks, the entire footprint of frame, 222, may be 27 inches by 27 inches. In such an embodiment, wheels, 244, may be eight inches in diameter.

As discussed above, a set of wheels, 244, may be attached to the frame, 222, to provide mobility. In the embodiment shown in FIGS. 8-10, the wheels are positioned at the four corners of frame, 222, and in this particular embodiment are attached to the inside edges of side rails, 241, by axles, 249, extending through openings in each wheel, 244, and respective side rail, 241. The axles, 249, are secured in place using various techniques, such as attaching lock collars, 251, to the outer ends of the axles, 249. Axles, 249, and collars, 251, are preferably comprised of stainless steel but other materials, such as aluminum or composition materials, may be used.

Figure 8:
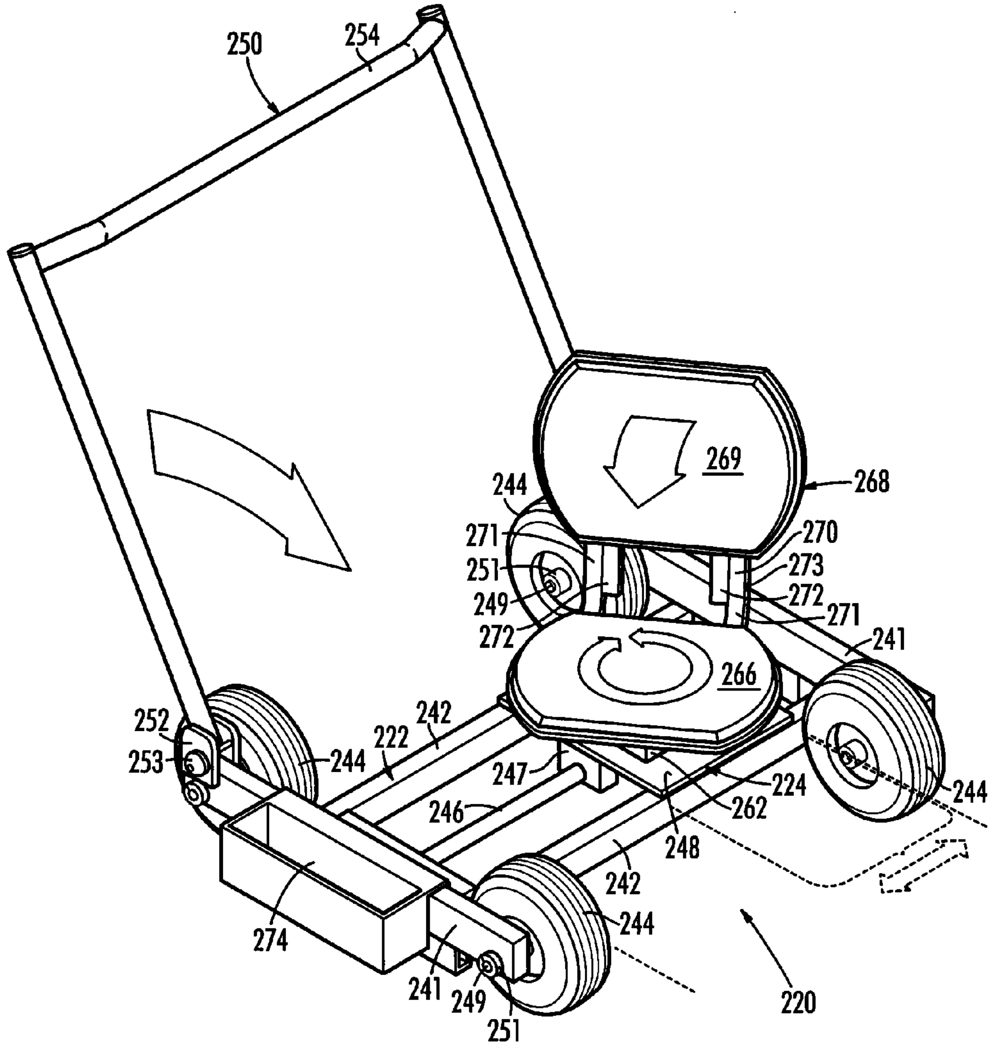
FIG. 8 is a schematic perspective view of an embodiment of the invention.
Figure 9:
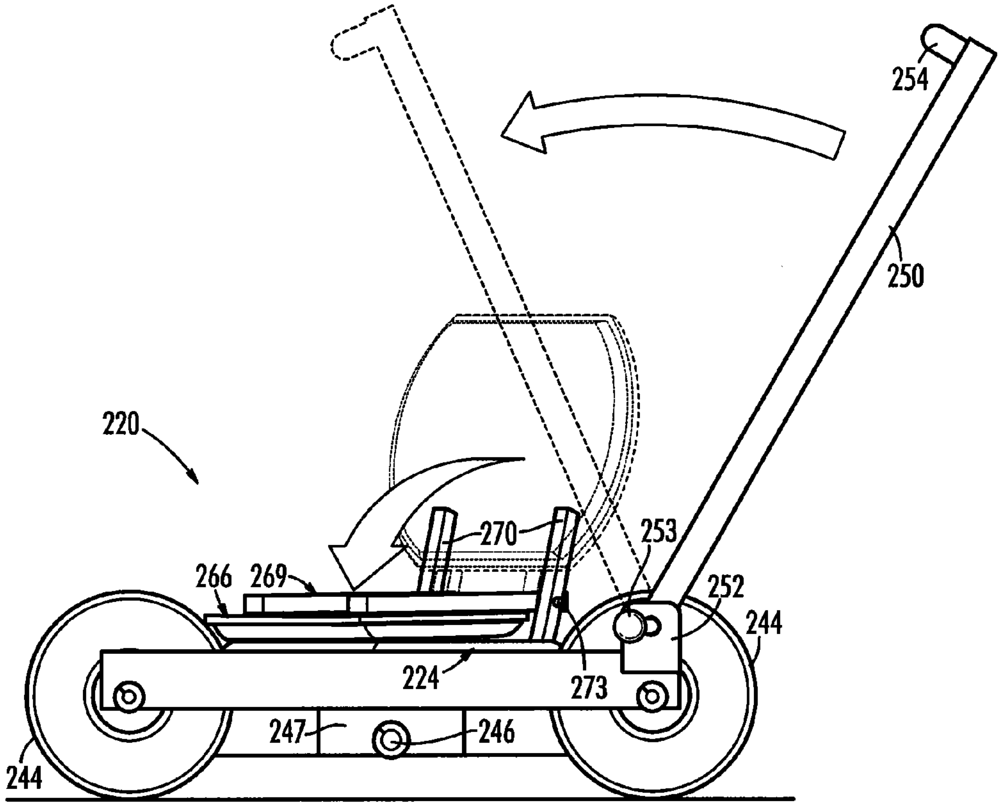
FIG. 9 is a schematic side view of an embodiment of the invention.
Figure 10:
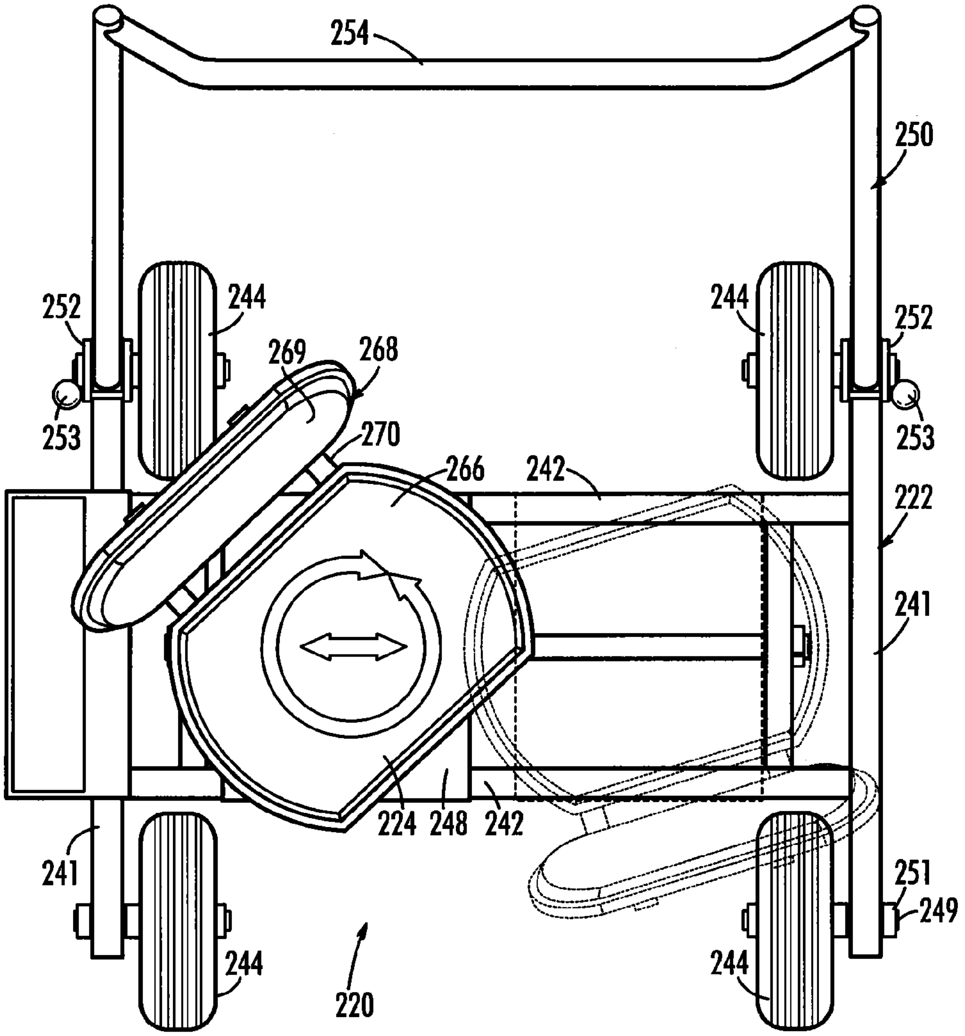
FIG. 10 is a schematic top view of an embodiment of the invention.

As shown in FIG. 8-10, a handle, 250, is preferably pivotably attached to the frame 222, by brackets, 252, affixed to side rails, 241. Handle, 250, may be pivotable between an upright position, such as at a comfortable pushing angle for pushing creeper, 220, and a stored position. A pin, 253, located on one or both sides of handle, 250, may be used to secure handle, 250, in either the upright or stored position. Pin, 253, is preferably comprised from stainless steel and includes a holding mechanism for easy removal and insertion by personnel into brackets, 252, and handle, 250. Handle, 250, may include a handrail, 254, for pushing creeper, 220. Handrail, 254, may angle inward as shown in FIG. 10 to allow clearance between the handrail, 254, and the wheels, 244, in the stored position and to create a more compact shape with the creeper, 220. A compact shape is preferred when it is necessary to store the creeper, 220, in small areas and/or to increase transportability when the creeper, 220, is carried.

The platform, 224, preferably comprises a seat, 266, and a back, 268, wherein the back, 268, is preferably mounted to the seat, 266. A head rest may also be provided for comfort. Seat, 266, may be padded and may include chemical and/or weather resistant material to increase durability of the seat, 266. Moreover, to provide a worker with maximum clearance while working under a rail car, seat, 266, may be positioned very near to the ground. In one embodiment, seat, 266, is approximately four and a half inches off of the ground.

In the embodiment shown in FIGS. 8-10, the back, 268, includes a back rest, 269, with mounting brackets, 270, for mounting the back rest, 269, to the seat, 266. As shown in FIG. 9, back rest, 269, may be collapsible and adjustable between a raised working position, shown by dotted lines in FIG. 9, and a lowered storing position, shown by solid lines in FIG. 9. A number of configurations of mounting brackets, 270, may be used to collapse back rest, 269. For example, as shown in the embodiment of FIG. 8, a pair of mounting brackets, 271, forming an L shape may be secured to the bottom of seat, 266, and extend up towards back rest, 269. A pair of standard connector brackets, 272, may be secured to the back of back rest, 269, and positioned to extend adjacent to the respective pair of L brackets, 271. A rotatable connector, such as an axle, 273, may be inserted through each respective pair of L brackets, 271, and connector brackets, 272, to rotatably secure the brackets, 271 and 272, together. Because the connector brackets, 272, attached to the back rest, 269, are rotatably secured to the L brackets, 271, which are attached to the seat, 266, the back rest, 269, can collapse towards the seat, 266. Stopping devices such as pins, springs, and/or gas struts, such as discussed with respect to the embodiment shown in FIGS. 1-4, may be incorporated to limit rotation of back rest, 269, relative to seat, 266 or position back rest, 269, at a predetermined angle.

Platform, 246, including seat, 266, is preferably rotatable and positioned on a turntable device, 262, such as a 360 degree swivel mount. As shown in FIGS. 8 and 10, turntable device, 262, may be secured between seat, 266, and a platform base, 248, so that seat, 266, rotates relative to the frame, 222. Alternatively, the turntable device, 262, may be secured directly to support member, 246, and/or cross-braces, 242. Because the turntable device, 262, allows rotation relative of the frame, 222, the range of reach available to personnel using the creeper, 220, is increased.

Platform, 224, is also preferably slidably attached to support member, 246, and/or cross-braces, 242, to allow platform, 224, to slide parallel with cross-braces, 242. In the embodiment of FIGS. 8-10, platform, 224, is slidably mounted to the support member, 246, by a tracking support, 247, such as two linear bearings affixed to the underside of platform, 224, and having openings extending therethrough. Platform, 224, slides along support member, 246, which slides within the opening of tracking support, 247. Platform, 224, may be stabilized by the platform base, 248. UHMW guide strips may also be utilized to guide platform base, 248, over cross-braces, 242. In the embodiment of FIGS. 8-10, platform base, 248, is secured and positioned above tracking support, 247, and slides above the front and rear cross-braces, 242, which in turn stabilizes platform, 224. Because the platform, 224, also slides relative to frame, 222, the range of reach available to personnel using the creeper, 224, is even further increased. Stop devices such as pins and/or springs may be incorporated to lock platform, 224, in a particular position.

Handles may be positioned along frame, 222, such as side rails, 241, to assist a worker in obtaining a particular position. Moreover, a compartment, 274, may be affixed to frame 222 for storage and collection of miscellaneous items such as tools, while work is being performed. Compartment, 274, may include drain holes.

When the creeper, 220, is used in connection with a railcar on a railway track, the creeper is preferably positioned perpendicular to the rails of the railway track. If the back rest, 269, is positioned in the stored position, it may be raised to the working position shown in FIG. 8 prior to positioning the creeper, 220, under the rail car. The creeper, 220, may be driven by engaging the handle, 250, towards the rails, and once the front wheels, 244, of the creeper, 220, reach the near rail of the railway track, downward pressure may be applied to the handle, 250. The front of the creeper, 220, including the front wheels, 244, lifts off of the ground and the weight of the creeper, 220, is supported by the rear wheels, 244. The creeper, 220, may then be rolled under a rail car and the front wheels, 244, may be rolled over the near rail of the railway track. Once the rear wheels, 244, of the creeper approach the near rail, the weight of the creeper may then be distributed to the front wheels, 244, by pushing up on the handle, 250. The rear wheels, 244, are then rolled over the near rail of the railway track. Once the rear wheels, 244, are over the near rail, pressure may be released from the handle, 250, allowing all wheels, 244, of the creeper to drop onto the rails. Both the rear and front wheels, 144, of the creeper, 220, may be positioned between the near and far rails of the railway track.

The worker may then sit on seat, 266, of platform, 224, and roll the creeper, 220, to a desired location under the railcar to perform the desired function. If necessary, the platform may be rotated on turntable, 262, or slid to a desired position along support member, 246. The handle, 250, can remain in the upright position, which may abut the railcar surface and stop the creeper, 250, from going all the way to the far rail of the railway track. Alternatively, the pin, 253, may be removed from the handle, 250, allowing the handle, 250, to either collapse over the creeper, 220, or collapse away from the creeper, 220. Once the operation is complete the process is reversed thereby removing the creeper, 220, from under the rail car.

Additional components and accessories may be incorporated into the creeper. For example, tool trays, drink holders, grounding straps, and the like may be incorporated into the creeper for convenience and functionality.

It should be noted that there are several configurations suitable for the design of the creeper of the present invention, and the shapes, sizes, and dimensions of the parts of the creeper discussed above are for example only and represent but a few of the configurations of the creeper. Other configurations altering the number of parts, attachment positions of the parts, means for attaching and securing the parts, and shapes, sizes, and dimensions of the parts could be employed to demonstrate the invention and are intended to be encompassed by the present invention. The description and drawings should not be deemed to narrow the scope of the present invention in any way.

While various embodiments of the present invention have been described above, it should be understood that they have been presented by way of example, and not limitation. It will be apparent to persons skilled in the relevant art(s) that various changes in form and detail can be made therein without departing from the spirit and scope of the present invention. In fact, after reading the above description, it will be apparent to one skilled in the relevant art(s) how to implement the invention in alternative embodiments. Thus, the present invention should not be limited by any of the above described exemplary embodiments.

In addition, it should be understood that the figures, which highlight the functionality and advantages of the present invention, are presented for purposes of example only. The architecture of the present invention is sufficiently flexible and configurable, such that it may be used in ways other than that shown in the accompanying figures.

Further, the purpose of the Abstract is to enable the U.S. Patent and Trademark Office and the public generally, and especially the scientists, engineers, and practitioners in the art who are not familiar with patent or legal terms or phraseology, to determine quickly from a cursory inspection the nature and essence of the technical disclosure of the application. The Abstract is not intended to be limiting as to the scope of the invention in any way.

The invention claimed is:

1. A creeper particularly adapted for operation under a railcar comprising:

a main frame comprising a front, a rear, a first side, and an opposing second side;

first wheels attached at said front of said main frame;

second wheels attached at said rear of said main frame;

a handle attached to said main frame at said rear of said main frame; and a rotatable platform attached to said main frame;

wherein said platform is slideable between said first side and said opposing second side of said main frame.

2. The creeper of claim 1 wherein said platform further comprises a seat and a seat back.

3. The creeper of claim 2 wherein said seat back is pivotally attached to said seat.

4. The creeper of claim 3 wherein said seat comprises an L bracket and said seat back comprises a mounting bracket, said seat and said seat back are pivotally attached by an axle extending between said L bracket and said mounting bracket.

5. The creeper of claim wherein said handle is collapsible over said main frame.

6. The creeper of claim 1 wherein said main frame further comprises a track, positioned between said front and said rear, a first end of said track is attached to said first side and a second end of said track is attached to said opposing second side, said rotatable platform slides along said track.

7. The creeper of claim 1 wherein said first wheels and said second wheels are positioned between said first side and said opposing second side of said main frame.

8. The creeper of claim 1 wherein said first side comprises a detachable tray.

9. A creeper particularly adapted for operation under a railcar comprising:

a main frame comprising a front, a rear, a first side, an opposing second side, and a track said track positioned between said front and said rear of said main frame and having a first end attached to said first side of said main frame and a second end attached to said opposing second side of said main frame;

first wheels attached at said front of said main frame;

second wheels attached at said rear of said main frame;

a handle attached to said main frame at said rear of said main frame;

a rotatable platform attached to said main frame, said rotatable platform slides between said first side and said opposing second side of said main frame along said track of said main frame; and a seat affixed to said platform, said seat comprising a seat bottom and a seat back.

10. The creeper of claim 9 wherein said seat back is pivotally attached to said seat bottom.

11. The creeper of claim 10 wherein said seat bottom comprises an L bracket and said seat back comprises a mounting bracket, said seat bottom and said seat back are pivotally attached by an axle extending between said L bracket and said mounting bracket.

12. The creeper of claim 9 wherein said handle is collapsible over said main frame.

13. The creeper of claim 9 wherein said first wheels and said second wheels are positioned between said first side and said opposing second side of said main frame.

14. The creeper of claim 9 wherein said first side comprises a detachable tray.

15. A creeper particularly adapted for operation under a railcar comprising:

a main frame comprising a front, a rear, a first side, and an opposing second side;

first wheels attached at said front of said main frame;

second wheels attached at said rear of said main frame;

a handle attached to said main frame at said rear of said main frame;

a rotatable platform attached to said main frame; and a seat secured to said rotatable platform;

wherein said handle is generally U-shaped and extends upward from said main frame above said seat and wherein said platform is slideable between said first side and said opposing second side of said main frame.

* * * * *